United States Patent [19]
Voegeli

[11] 3,860,965
[45] Jan. 14, 1975

[54] MAGNETORESISTIVE READ HEAD ASSEMBLY HAVING MATCHED ELEMENTS FOR COMMON MODE REJECTION

[75] Inventor: Otto Voegeli, San Jose, Calif.

[73] Assignee: International Business Machines Corporation, Armonk, N.Y.

[22] Filed: Oct. 4, 1973

[21] Appl. No.: 403,704

[52] U.S. Cl. .............................................. 360/113
[51] Int. Cl. .............................................. G11b 5/30
[58] Field of Search ...... 360/113; 324/46; 338/32 R

[56] References Cited

UNITED STATES PATENTS

| | | | |
|---|---|---|---|
| 3,813,692 | 5/1974 | Brock et al. | 360/113 |
| 3,814,863 | 6/1974 | O'Day et al. | 360/113 |

OTHER PUBLICATIONS

O'Day, R. L., IBM Tech. Disc. Bull., Vol. 15, No. 9, Feb. 1973 pg. 2680.

*Primary Examiner*—Bernard Konick
*Assistant Examiner*—Robert S. Tupper
*Attorney, Agent, or Firm*—Nathan N. Kallman

[57] ABSTRACT

A magnetic read head assembly comprises two magnetostatically coupled magnetoresistive (MR) elements, and conducting means for supplying a drive current to the elements. The drive current serves as a sense current as well as a bias current. The drive current is provided to both elements concurrently, so that the current through each element serves to magnetically bias the other element. An output differential read signal is obtained from the two MR elements.

6 Claims, 5 Drawing Figures

MAGNETORESISTIVE READ HEAD ASSEMBLY HAVING MATCHED ELEMENTS FOR COMMON MODE REJECTION

BACKGROUND OF THE INVENTION

1. Field of the Invention

This invention relates to a novel magnetoresistive magnetic read head assembly.

2. Description of the Prior Art

Magnetoresistive magnetic transducer assemblies fabricated with thin film technology advantageously provide a means for increasing the bit density in magnetic recording systems, since such assemblies are of small size and independent of the relative velocity between the magnetic medium and the transducer. In magnetoresistive sensors, thermal fluctuations produce resistance changes of the sense element and thus an associated noise signal. Thus, safeguards must be incorporated into the magnetoresistive transducer to reduce its susceptibility to noise such that an acceptable signal-to-noise ratio is attained.

A magnetic head directed toward the concept of eliminating common mode noise is described in IBM Technical Disclosure Bulletin, Vol. 15, No. 9, Feb. 1973 at p. 2680 by R. L. O'Day, and is schematically illustrated in FIG. 1 of this application. This publication, entitled "Balanced Magnetic Head," describes a magnetic read head with two magnetoresistive (MR) elements 10 and 11 having a central current conductor 13. The bias current $I_b$ flowing through said bias conductor 13 serves to apply a bias field to each of the MR sense elements. The MR elements are connected in a bridge circuit with resistors R. A source voltage 19 applied to the junction of the resistors produces a sense current $I_s$ through each MR element. The output of the bridge is monitored by a differential amplifier 18 which senses the difference in voltage drop across the MR elements, thus rejecting common mode signals caused by temperature drift, for example.

Accordingly, this prior art structure requires a bias current through the center conductor in addition to the sense current through each of the magnetoresistive elements. The bias current needs to provide a bias field which is about 0.7 of the total anisotrophy field. Said total anisotrophy field is composed of an induced anisotrophy (during film fabrication) and a shape anisotrophy whose strength depends on the geometry of the sense elements. Typically for Permalloy magnetoresistive films of suitable geometry induced anisotrophy field is 5 oersteds and that associated with the shape anisotrophy is 40 oersteds for films separated by a relatively thick conductor as not to be magnetostatically coupled. Thus, the required bias field is about 31 oersteds necessitating a bias current which is substantially larger than the drive currents required in the present invention. In view of the high bias current required, much heat is dissipated by the MR elements. Consequently there is a temperature increase at the elements which causes a change in resistance, thus changing their quiescent operating point on the characteristic curve. A more serious problem is the localized thermal fluctuation due to interaction with the recording medium. Common mode rejection requires very small separation between MR elements.

It should also be recognized that in order to insulate the magnetoresistive elements from the bias current and to provide a conducting layer sufficiently thick enough to carry the required bias current the elements are separated by a length of more than 6,000 angstroms (A). At this distance of separation, the elements are essentially not coupled magnetostatically and subject to different thermal fluctuation.

SUMMARY OF THE INVENTION

An object of this invention is to provide a simple, relatively small magnetic transducer that is capable of reading information from magnetic tapes, disks, magnetic bubble memories or other magnetic media.

Another object is to provide a magnetic head assembly that provides common mode rejection of noise.

Another object is to provide magnetoresistive elements which are strongly coupled magnetostatically as to largely eliminate the shape anisotrophy of said elements and thus substantially reduce the magnitude of required bias fields.

Another object is to provide a magnetic head that provides closely spaced magnetic shielding for the magnetoresistive elements.

In accordance with this invention, a novel magnetic read head comprises two magnetoresistive elements that are magnetostatically coupled, wherein drive current serves as sense current through a given element and also as bias current for the other element. Although the elements are magnetostatically coupled, they are electrically isolated from each other.

BRIEF DESCRIPTION OF THE DRAWINGS

The invention will be described in greater detail with reference to the drawing, in which.

Similar numerals refer to similar elements throughout the drawing.

DESCRIPTION OF THE PREFERRED EMBODIMENT

Figure 1:
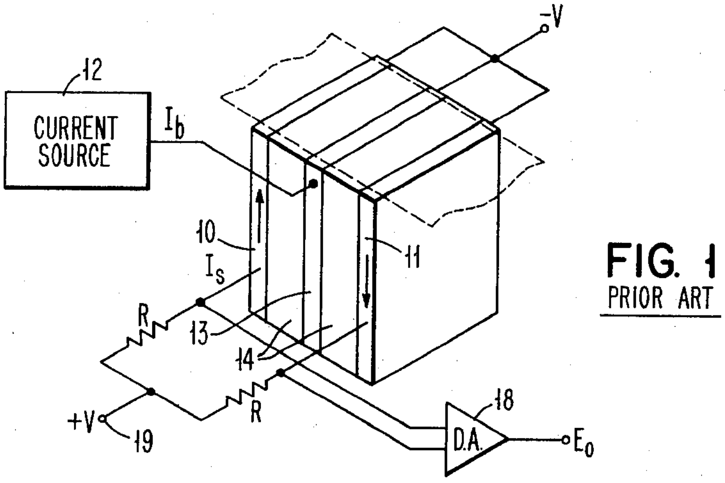
FIG. 1 PRIOR ART
FIG. 1 is a schematic diagram of a magnetoresistive transducer, representative of the prior art.
Figures 2, 3:
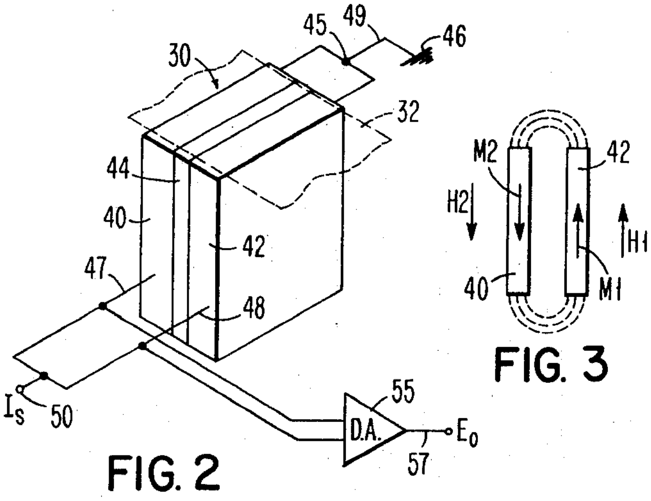
FIG. 2 is a schematic diagram of the magnetic transducer assembly of this invention.
FIG. 3 is an illustration of the coupled magnetoresistive films employed in this invention.
Figure 5:
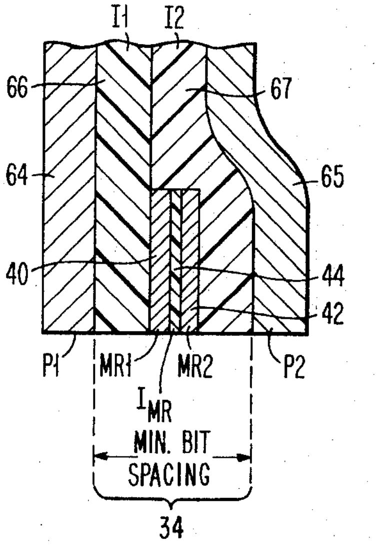
FIG. 5 is a cross section view of the preferred embodiment of the magnetic read head of this invention.

With reference to the drawings and in particular to FIGS. 2 and 5, there is shown a magnetic head assembly, generally designated by the numeral 30 for sensing bits recorded on a track of a magnetic tape 32 moving relatively to the assembly. It is apparent that the track may be associated with a rotating magnetic disk or other magnetic medium, or that the bits can be generated by moving magnetic bubbles.

In practice, the head assembly is fabricated as a multilayer thin film using conventional vapor deposition and electroplating techniques, and comprises magnetoresistive (MR) elements 40 and 42 that are magnetostatically coupled to one another. The MR elements may be formed as thin ferromagnetic films parallel to one another and are separated by a thin insulating layer 44. The elements 40 and 42 have low anisotrophy and a high magnetoresistance coefficient. The MR elements are matched to each other and have substantially the same thickness, dimensions, resistance, coefficient of the thermal expansion, resistivity and shape anisotrophy. The MR elements 40 and 42 have a common junction 45 which is connected through a conductor 49 to a reference voltage source, such as ground terminal 46. The elements receive current from a constant current source 50 applied through conductors 47 and 48. The conductors 47, 48 and 49 are deposited over the ends of the MR elements. A differential amplifier 55 is connected to the output of the elements. Accordingly, the voltage difference signal across the MR elements is sensed by the amplifier 55, and appears after amplification at output terminal 57. Thus, when a drive current from source 50 is applied through conductors 47 and 48 to the elements, the drive current through MR element 40 energizes that element and serves to magnetically bias magnetoresistive element 42. Similarly, the drive current through MR element 42 energizes that element and serves to magnetically bias element 40. The drive current required for this assembly is considerably less than the bias current used with prior known devices.

The coupling of the elements is illustrated schematically in FIG. 3, where H1 is the magnetic field acting on MR element 42 due to the current flowing through element 40 and M1 is the magnetization component in the vertical direction with respect to the medium due to the corresponding magnetic field H1. Likewise M2 is the magnetization in element 40 due to the current passing through MR element 42. Since the two MR elements are matched, the magnetization components M1 and M2 perpendicular to direction of current flow are equal. However, it should be recognized that the magnetic read head is operable as long as the product of the thickness of an MR element and the magnetization component set up within the element is substantially equal for the two magnetostatically coupled MR elements.

The thin insulating means 44 which separates the MR elements breaks the magnetic exchange coupling between the elements and electrically isolates one element from the other. Preferably the insulation is silicone monoxide although silicone dioxide, aluminum oxide or other insulating materials may be used.

Magnetic shield layers 64 and 65 prevent extraneous magnetic fields from being sensed by the MR elements 40 and 42 (see FIG. 5). The spacing between shields 64 and 65 determines the minimum bit spacing allowable. As long as the bits are spaced at distances greater than the inside dimensions of the shield, only the bit 34 under the MR elements is sensed by the elements. This bit spacing prevents the MR elements from sensing two different bits at any one time. The shield layers 64 and 65 are insulated from the MR elements by insulating layers 66 and 67, as illustrated in FIG. 5.

In the preferred embodiment, the shield layers 64 and 65 are Permalloy having an 80 percent nickel—20 percent iron composition and are one micron thick. The MR elements are Permalloy having an 80 percent nickel—20 percent iron composition and are approximately 0.03 microns thick. The insulating layer 44 is silicon monoxide and is also about 0.03 microns thick, and the insulating layers 66 and 67 are silicone monoxide and are about 1 micron thick. Accordingly, because the outer insulating layers are much thicker than the MR elements, the distance between the shields is substantially equal to that of the thicknesses of the insulating layers which is about 0.5 microns each. Thus, this magnetic head assembly can sense flux changes of approximately 10,000 bits per centimeter. If higher bit densities are desired, the thickness of the insulating layers 66 and 67 can be appropriately decreased.

Figure 4:
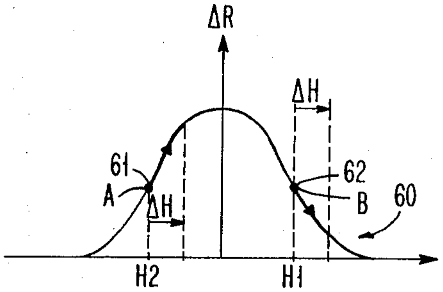
FIG. 4 is a characteristic curve for the magnetoresistive element of this invention, illustrating the variation in resistance R versus the magnetic field H applied to the element.

With reference to FIGS. 2 and 4, the magnetoresistive elements 40 and 42, which are magnetostatically coupled, are connected through respective conductors 47 and 48 to the current source 50 which supplies a drive current through each of the elements. Thus, changes in the resistance of each of the elements appears as a signal voltage at the input of amplifier 55. The resistance change of each of the elements 40 and 42 is shown as a function of magnetic field H in FIG. 4. Because the elements are identical, a single characteristic curve 60 may be utilized to depict the behavior of the elements. The drive current through element 40 energizes that element and also magnetically biases magnetoresistive element 42 at operating point 61 on the characteristic curve. Similarly, element 40 is magnetically biased at operating point 62. The operating points are preferably at the point of inflection of the curve in the linear region such that a small magnetic signal from the medium will produce the largest and most linear resistance change and voltage drop through the element. For example, a bit of magnetically recorded information causes the resistance of the MR element 40 to increase and causes the resistance of element 42 to decrease.

Since the resistance changes are of equal magnitude but opposite polarity, the output signal produced at the output terminal of the differential amplifier 55 is equal to twice the drive current times the resistance change in an MR element. In addition, the head assembly of this invention provides common mode rejection of thermal noise, since temperature changes produce substantially equal resistance changes in the matched MR elements. Thus, the operating points 61 and 62 are moved upwardly or downwardly along the characteristic curve 60 the same amount and in the same direction for both MR elements. Consequently, only the recorded bits produce a difference in voltage across the MR elements whereby common mode rejection of noise is also provided for localized variations in temperature.

In configurations of MR elements which do not have isotropic shapes, such as a rectangular film, the magnetization alignment is along the easiest path, which is the longest dimension. In such case, undesirable demagnetizing fields are created within the MR elements. With the configuration of the head assembly of this invention, shape anisotrophy is not a problem, since the two matched coupled MR elements provide a substantially closed path for the magnetic flux.

There has been described herein a magnetoresistive head, comprising two magnetostatically coupled magnetoresistive elements for reading bits of magnetically recorded information, which rejects noise produced by thermal fluctuations as well as other changes in drive current, mechanical stress, and the like. The head lends itself to high density magnetic recording.

While there has been described what is presently considered to be the preferred embodiment of the invention, it will be understood that various modifications of materials, dimensions and configuration may be made within the scope of the invention.

What is claimed is:

1. A magnetic read head assembly for sensing magnetically recorded information comprising:

two magnetostatically coupled magnetoresistive elements, said elements having substantially the same thickness and magnetic properties;

insulating means disposed between said elements for breaking the magnetic exchange coupling between said elements, and for electrically isolating one element from the other element;

means for supplying a drive current concurrently to said elements so that the current through each element serves to magnetically bias the other of said elements, said elements being biased in opposite directions; and signal output means connected to said elements, including means for sensing the difference in voltage of the elements.

2. The magnetic head assembly of claim 1, wherein said means for supplying a drive current includes a constant current source.

3. The magnetic head assembly of claim 1, wherein said difference sensing means comprises a differential amplifier.

4. The magnetic head assembly of claim 1, further comprising magnetic shield means for magnetically shielding said magnetoresistive elements from magnetic fields emanating from sources other than the recorded bit of magnetic information being sensed.

5. The magnetic head assembly of claim 1, wherein said magnetoresistive elements are matched magnetically and electrically.

6. An assembly for sensing magnetically recorded information and providing common mode rejection of noise, said assembly comprising:

two matched magnetoresistive elements in close proximity to one another having substantially the same thickness and same magnetic properties, so as to be magnetostatically coupled insulating means disposed between said elements for breaking the magnetic exchange coupling between said elements, and for electrically isolating one element from the other element; and means for supplying a drive current concurrently to said elements; so that the current through each element serves to magnetically bias the other of said elements, said elements being biased in opposite directions, such that the magnetic field associated with each bit of magnetically recorded information causes resistance changes of opposite polarity in said elements, whereas thermal fluctuations and sources of noise signals produce resistance changes of identical polarity in each element whereby only the recorded bits produce a difference in voltage across said elements, and common mode rejection is provided for thermal fluctuations and noise signals;

signal output means connected to said elements, including means for sensing the difference in voltage of the elements.

* * * * *